Figure 1:
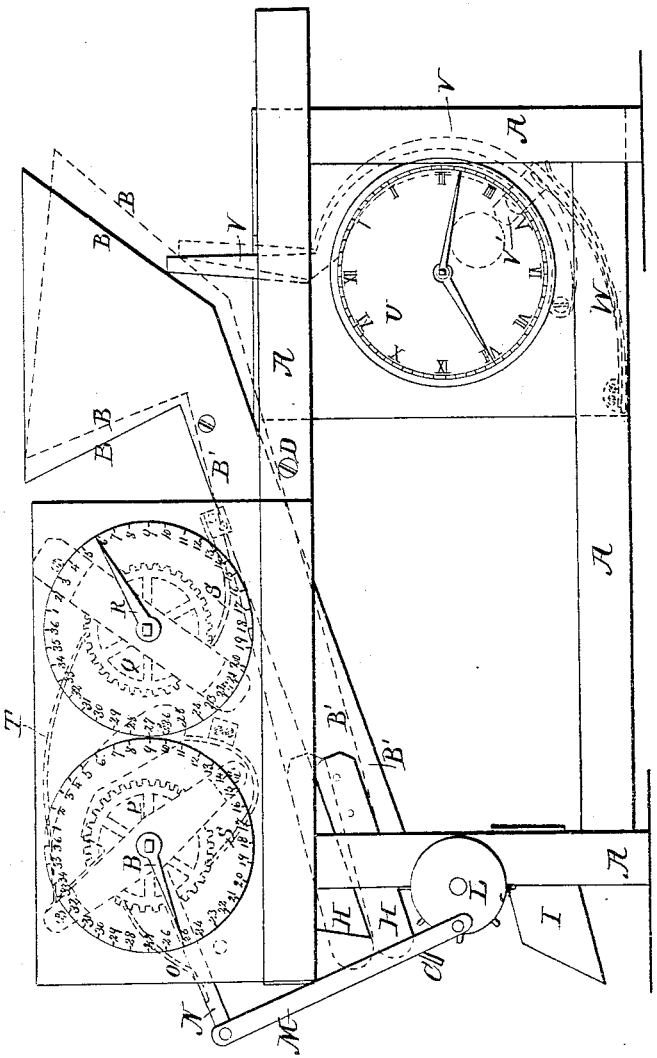

W. SCHNEBLY.
Grain Meter.

No. 57,580.

2 Sheets—Sheet 1.

Patented Aug. 28, 1866.

Witnesses
G. H. Smith
Geo. C. Lambright

Inventor.
William Schnebly
By E. B. & W. H. Forbush
Attorney

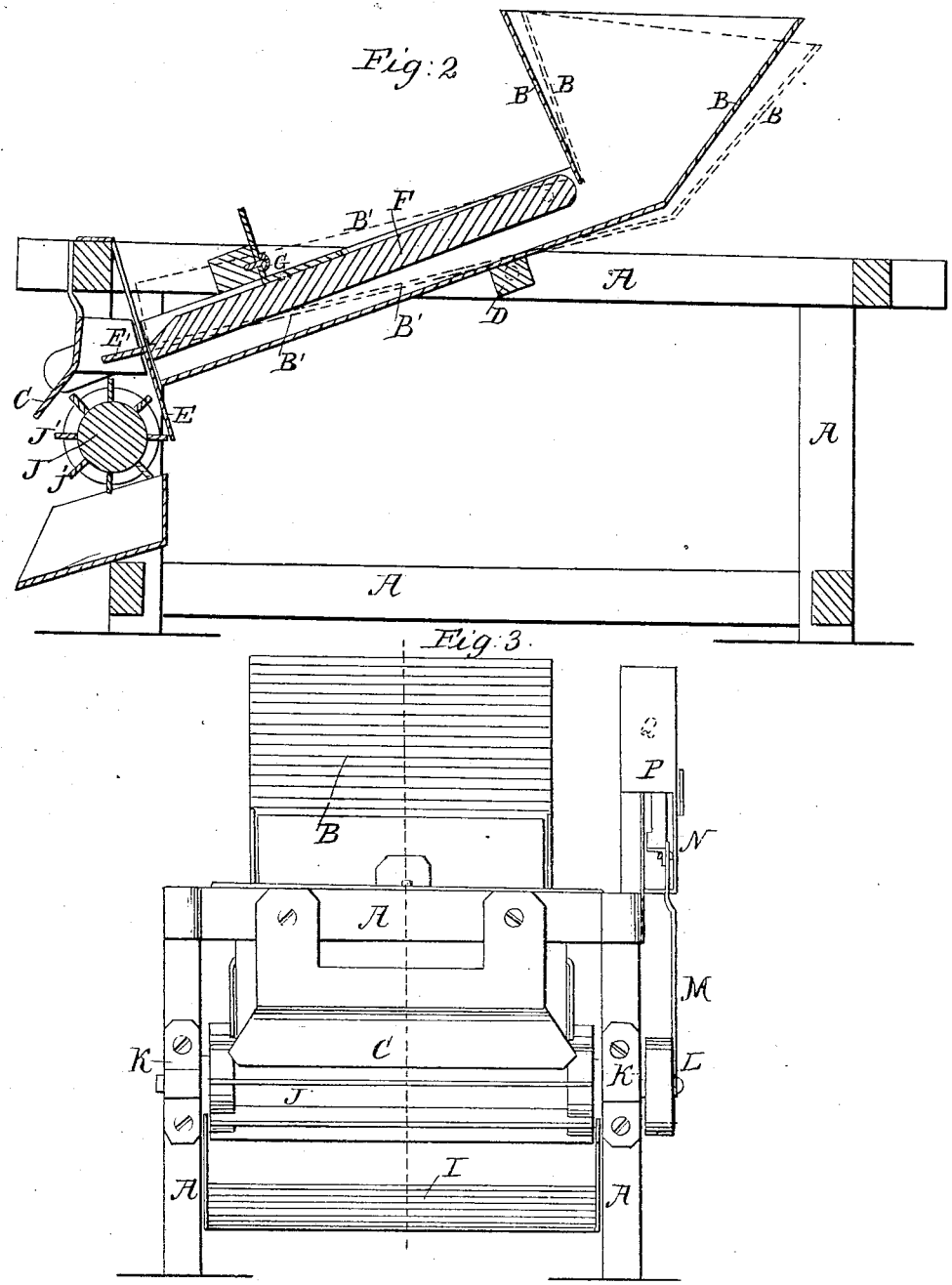

UNITED STATES PATENT OFFICE.

WILLIAM SCHNEBLY, OF HACKENSACK, NEW JERSEY.

IMPROVEMENT IN GRAIN-METERS.

Specification forming part of Letters Patent No. 57,580, dated August 28, 1866.

*To all whom it may concern:*

Be it known that I, WILLIAM SCHNEBLY, of Hackensack, in the county of Bergen and State of New Jersey, have invented a new and Improved Machine for Measuring Grain by Weight, which I denominate a "Grain-Meter;" and I do hereby declare that the following is a full and exact description of the invention, sufficient to enable others skilled in the art to which it appertains to construct and use the same, reference being had to the annexed drawings, making a part of this specification, in which—

Figure 1 is a side elevation of my said improved grain-meter. Fig. 2 is a longitudinal section of the same. Fig. 3 is a front elevation.

The nature of this invention relates, first and broadly, to such combination of mechanism as will register the velocity which a moving column of grain will impart to a grain-wheel upon which it falls, and thereby furnish data to determine the weight of the grain which has been subjected to such movements; secondly and specifically, to such construction and combination of a hopper and trough with a grain-wheel that a quantity of grain moving in said hopper and trough and upon said wheel will have the effect to start, operate, and stop a velocity-registering apparatus, whereby the weight of different qualities of grain may be correctly determined.

Letters of like name and kind refer to like parts in each of the figures.

A represents the frame-work, made of wood or iron, which supports the working parts of the machine.

B represents the hopper which receives the grain to be weighed, and B' the spout or trough which conducts it from the hopper to the grain-wheel. This hopper and trough are joined together and supported and balanced upon central journals or shaft, D, which permit an oscillating movement of the hopper and trough.

The blue lines B B', Figs. 1 and 2, show the position of the hopper and trough when the machine is stopped or not at work, and the red lines B B' show their position when the machine is at work.

E represents a cut-off, which stops the flow of the grain from the mouth of the trough to the wheel when the trough drops down to its lowest position. (Shown by the blue lines B'.)

E' represents an apron, which carries the grain along from the trough to the grain-wheel. This apron is a continuation of the bottom of the trough when the mouth of the trough is up to its highest position, (indicated by the red lines B' in Figs. 1 and 2,) so that the grain has a direct passage from the hopper through the trough over the apron to the bucket or grain-wheel. This trough has an adjustable top or cover, which is shown at F, by which its mouth or discharge-aperture may be increased in size or diminished at pleasure, and fixed or held at any required size of aperture. This cover is made adjustable by means of a slotted elbow-piece and set-screw, as shown at G; or any other equivalent device may be used for that purpose.

C is a shield, placed in front of the trough to prevent the grain from scattering as it leaves the apron, and so as to insure all the grain to fall onto the grain-wheel.

Stop-pieces H are made fast to the trough, (one on either side,) which project in a manner to strike upon the bucket or grain-wheel and stop the wheel instantly when the trough moves to its lowest position. This movement of the trough is effected when the grains pass out of the hopper, so as to give a preponderance of weight in the trough; and when there is a preponderance of weight in the hopper, so that the mouth of the trough rises, the grain-wheel is by that movement instantly released and caused to revolve by the grain falling into the buckets thereof.

I represents a spout, which catches the grain as it falls from the grain-wheel and conducts it to a proper bin or receiver.

J represents the bucket or grain-wheel. It is hung in suitable journals in the frame-work, as shown at K, Fig. 3, and in front of the trough, so as to catch the grain as it falls from the mouth of the trough. The buckets J' are of sufficient capacity to receive all the grain which flows through the trough as the wheel revolves. The wheel is similar in construction to an overshot water-wheel. The motion and gravity of the grain, acting upon the bucket-wheel, cause it to revolve with a velocity which has a definite and fixed ratio to the gravity of the grain.

L is a crank-wheel, which is fixed on the end of the bucket or grain-wheel shaft, having a connecting-rod, M, which connects it to the ratchet-lever N, which lever has a spring-ratchet, O, connecting with the wheel-register. The wheel-register consists of two sets of count-wheels, P and Q, with index face and hands of ordinary and well-known construction. The one, P, is a single counter, and the other is a multiplier. The face of each is divided into thirty-six degrees, more or less, with corresponding numbers, as shown, with index-fingers R.

S represents a spring-dog connected with each counter, and T a spring-ratchet connecting the single counter to the multiplier. This registering apparatus determines the number of revolutions which the grain-wheel makes. Any similar apparatus of well-known construction may be adopted and used for this purpose.

The time-register consists of a marine clock, watch, or other suitable time-piece of well-known construction, provided with a stop and start, and so placed and connected with the machine that a certain movement of the grain hopper and trough will have the effect to stop and start the time-piece.

The stop-and-start mechanism consists of the bent lever V, having a projecting nib, V', thereon, and the spring W. Its operation is as follows: The bent lever projects upward and connects with the hopper, as shown in the drawings. When the hopper is in its highest position, as indicated by the blue lines B, then the spring W acts in a manner to force the projecting nib V' against a wheel of the time-piece and stop it instantly; and when the hopper moves to the position indicated by the red lines B, it moves the lever back in a manner to release the stop and allow the time-piece to work.

Any common and well-known mechanism may be employed as a stop and start.

It will be noticed that the time-register works simultaneously with the grain-wheel and its register. At the moment the grain-wheel starts the time-register starts, and the moment the grain-wheel stops the time-register stops, and both are dependent upon and governed by the motion and gravity of the grain passing through the machine.

Operation: This machine is designed to weigh a moving body of grain by the employment of mechanism which marks movement and time. The hopper B and trough B' are so constructed and balanced upon their central shaft, D, that there will be a slight preponderance of weight in the trough. The trough stands upon an inclination, as shown in the drawings, so that the gravity of the grain will cause it to flow freely through the trough. The grain to be measured is caused to flow into the hopper, and thence into the trough. The mouth of the trough being in its lowest position when the grain is let in, the cut-off E will prevent it from passing out, and hence the trough will be first filled; but the hopper holds more grain than the trough, and hence as it fills by the inflowing grain there will soon be a preponderance of weight in the hopper, which will cause a movement of the hopper and trough upon their central axis, D, into the position indicated by the red lines B B', which movement raises the mouth of the trough above the cut-off and releases the grain-wheel from the stops H and allows the grain to flow freely over the apron upon the grain-wheel, causing it to revolve and the velocity mechanism to work. I have discovered that grain will flow through the inclined trough or spout and fall upon the grain-wheel and revolve it with a velocity which has a definite and fixed ratio to the gravity of the grain. Heavy grain moves the wheel with greater velocity than light grain, and vice versa.

An equal quantity of grain of the same quality will pass through the trough and revolve the wheel with equal velocity at all times. Any quality of grain, light or heavy, passing through the trough and falling upon the wheel, will cause it to revolve with a velocity which has a definite and fixed ratio to the gravity of the grain.

The revolutions of the wheel are correctly indicated by the wheel-register, and the time occupied by the revolutions of the wheel is correctly marked by the time-piece, and hence the velocity of the wheel is obtained.

Now, it is necessary to have some data from which to calculate the weight of the grain which passes over the wheel at any running thereof. For this purpose, run any convenient quantity of a standard quality of grain through the machine, and then accurately weigh it by weighing-scales, and thereby ascertain the exact number of pounds of grain which passes over the wheel in one revolution thereof, which we will suppose to be one hundred and sixteen pounds, and note the time occupied by the wheel in one revolution, which we will suppose to be five seconds. This furnishes data for the calculation of the weight of grain which may at any time be passed through the machine.

Data may be obtained in the same manner for each kind of grain—wheat, corn, oats, rye, barley, &c.—if preferred; but you must notice that the five seconds of time occupied by the wheel in one revolution is but one unit of time, which corresponds to and equals one revolution of the wheel, which is one unit of movement.

Now, suppose a quantity of grain is run through the machine, and the wheel-register indicates five revolutions of the grain-wheel, and the time-register indicates twenty-five seconds, or five units of time. You will know this is equal to the standard quality of grain which fixed the data, because the units of movement just equal the units of time, and hence, there being five units of time, there will be five times the quantity of grain which passed over the wheel in one unit of time, or five hundred and eighty pounds, which is the exact weight.

Now, suppose that at the next time the machine is used a different quality of grain comes forward to be weighed, and after it has passed through the machine you find that the wheel-register indicates five revolutions, or five units of movements, and the time-register indicates seven units of time. You will understand that this quality of grain is inferior to or lighter than the standard quality, for the reason that time has gained on movement, there being seven units of time and five units of movement.

Now, suppose that another quality of grain comes forward to be weighed at the next running of the machine, so that the wheel-register indicates seven units of movement and five units of time. Now you know that a superior quality of grain has passed through the machine, because movement has gained on time.

Hence a rule of double proportion is deduced, by which the exact weight of any quality which passes through the machine may be determined. The rule may be stated in words as follows: If one unit of movement and one unit of time give one hundred and sixteen pounds of grain, what will any given number of units of movement and units of time give? The units of movement must occupy the first and the units of time the second term of the demand.

A statement in figures of the second example above would be thus:

$$1:1::116$$
$$5:7$$

The third term of the predicate and the second term of the demand being multiplied together give a product of 812; but the second term of the demand exceeds the first by two units, and the grain weighed is deficient of the standard grain by two units of time, which equals two hundred and thirty-two pounds, which, substracted from the product, (812,) leaves five hundred and eighty pounds as the exact weight.

A statement in figures of the third example above given is thus:

$$1:1::116$$
$$7:5::$$

The third term of the predicate being multiplied by the second term of the demand gives a product of 580; but the first term of the demand exceeds the second by two units, and hence the grain weighed exceeds the standard grain by two units of movement, which is equal to two hundred and thirty-two pounds, which amount must be added to the product, (580,) which makes eight hundred and twelve pounds as the true weight of the grain.

This rule will hold good and accurate for all kinds and qualities of grain weighed in any quantities.

Take another example: Suppose that from another running of the machine the wheel-register indicates ninety-six units of movement and the time-piece indicates eight minutes and twenty seconds. Now reduce minutes and seconds to units of time. Eight minutes and twenty seconds equal five hundred seconds, and five hundred seconds equal one hundred units of time. Hence the statement will be thus:

$$1:1::116$$
$$96:100::$$

The third term of the predicate multiplied by the second term of the demand, gives eleven thousand six hundred pounds; but the time-units have gained four over the units of movement, and hence this quality of grain is deficient four units of time, which equals four hundred and sixty-four pounds. This amount subtracted from the product of the standard weight leaves eleven thousand one hundred and thirty-six pounds as the true weight. It will be noticed that one unit of movement or one unit of time is equal to one hundred and sixteen pounds of the standard quality of grain.

What I claim as my invention, and desire to secure by Letters Patent, is—

1. A grain-meter so constructed and combined with a velocity-registering apparatus that the velocity which a body of grain moving through the meter imparts to its grain-wheel will be correctly registered, whereby the weight of the grain which has thus passed through the machine may be correctly ascertained.

2. A grain hopper and trough supported upon a shaft or journals, upon which they may oscillate, in combination with a grain-wheel, so that a quantity of grain moving in said hopper and trough and upon said wheel will have the effect to start, operate, and stop a velocity-registering apparatus, by which means the weight of different qualities of grain may be correctly determined.

WILLIAM SCHNEBLY.

Witnesses:
HARVEY JONES,
S. W. HASTINGS.